United States Patent
Nagel

(10) Patent No.: US 6,572,792 B1
(45) Date of Patent: Jun. 3, 2003

(54) COMPOSITION OF MATTER TAILORING: SYSTEM 1

(75) Inventor: Christopher J. Nagel, Wayland, MA (US)

(73) Assignee: Atomic Ordered Materials, L.L.C., Fall River, MA (US)

( * ) Notice: Subject to any disclaimer, the term of this patent is extended or adjusted under 35 U.S.C. 154(b) by 0 days.

(21) Appl. No.: 09/416,720

(22) Filed: Oct. 13, 1999

(51) Int. Cl.[7] .............................. H01B 1/02; C22C 9/00
(52) U.S. Cl. ...................... 252/512; 148/95; 148/221; 420/469
(58) Field of Search ................... 252/512, 513, 252/514; 148/95, 500, 501, 207, 221, 553; 420/469; 423/414, DIG. 10, DIG. 12

(56) References Cited

U.S. PATENT DOCUMENTS

| | | | |
|---|---|---|---|
| 5,288,342 A | 2/1994 | Job | 148/320 |
| 5,308,379 A * | 5/1994 | Ishida et al. | 75/646 |
| 5,362,421 A * | 11/1994 | Kropp et al. | 252/512 |
| 5,449,491 A | 9/1995 | Job | 420/590 |
| 5,632,826 A | 5/1997 | Hultin-Stigenberg et al. | 148/326 |
| 5,759,308 A | 6/1998 | Hultin-Stigenberg et al. | 148/607 |
| 6,008,069 A | 12/1999 | Yamada | 438/113 |
| 6,192,969 B1 * | 2/2001 | Bunn et al. | 164/122.1 |
| 6,277,438 B1 | 8/2001 | Olivas | 427/154 |
| 6,303,760 B1 | 10/2001 | Dorn et al. | 534/11 |

FOREIGN PATENT DOCUMENTS

JP   4-99236   * 3/1992

OTHER PUBLICATIONS

Job, Jennifer, "New Carbon Molecules Make Stronger Metals," The World and I, Apr. 1999, pp. 170–177.
Burstein, et al., "Electrochemically Induced Annealing of Stainless–Steel Surfaces," Nature, 407:885–887 (2000).
Gorman, J., "New Work Improves Stainless Steel Surface," Science News, 158:263 (2000).
Weiss, P., "Pores of Glass Skin Shrink from Light," Science News, 158:312 (2000).
Weiss, P., "Light Pulses Flout Sacrosanct Speed Limit," Science News, 157:375 (2000).
Weiss, P., "Vibrations Flit Along Water's Fast Lane," Science News, 156:358 (1999).
Weiss, P., "Electron Breakup? Physics Shake–up," Science News, 158:216 (2000).
Milius, S., "Wasps Drive Frog Eggs to (Escape) Hatch," Science News, 158:246 (2000).
Gorman, J., "Crystal Reveals Unexpected Beginnings," Science News, 158:84 (2000).

(List continued on next page.)

Primary Examiner—Mark Kopec
(74) Attorney, Agent, or Firm—Hamilton, Brook, Smith & Reynolds, P.C.

(57) ABSTRACT

A composition of matter includes a changed underlying electronic structure of a mass or matter containing a 'p', 'd' and/or 'f' atomic orbital. The structural change is accompanied by changes in energy or mass or both.

2 Claims, 22 Drawing Sheets

XRF ANALYSIS

OTHER PUBLICATIONS

Weiss, P., "Voltage Flip Turns Magnetism on, off," *Science News*, 159:63 (2001).

Ohno et al., "Electric–field Control of Ferromagnetism," *Nature*, 408:944–946 (2000).

Weiss, P., "Light Stands Still in Atom Clouds," *Science News*, 159:52 (2001).

Gorman, J., "Strange Crystal Birth Found in Mine," *Science News*, 158:207 (2000).

Gorman, J., "A Late Arrival for Platinum and Gold?," *Science News*, 158:207 (2000).

Holzheld et al., "Evidence for a Late Chondritic Veneer in the Earth's Mantle From High–Pressure Partitioning of Palladium and Platinum," *Nature*, 406:396–399 (2000).

Kishimoto et al., "Observation of Nuclear Excitation by Electron Transition in 197 Au with Synchrotron X Rays and an Avalanche Photodiode," *The American Physical Society*, 85:1831–1834 (2000).

Carreyre, et al., "First Direct Proof of Internal Conversion Between Bound States," *The American Physical Society*, 62:024311–1/024311–8 (2000).

Jacoby, Mitch, "Picture–Perfect Orbitals," *C& EN*, p. 8, Sep. 6, 1999.

Zuo, et al., "Direct Observation of d holes and Cu–Cu Bonding in Cu20," *Nature*, 401:49 (1999).

Raloff, J., "Medicinal EMFs: Harnessing Electric and Magnetic Fields for Healing and Health," *Science News*, 156:316–318 (1999).

Weiss, P., "Magnetic Whispers: Chemistry and Medicine Finally Tune into Controversial Molecular Chatter," *Science News*, 159:42–44 (2001).

Weiss, P., "Breaking the Law: Can Quantum Mechanics + Thermodynamics × Perpetual Motion?," *Science News*, 158:234–239 (2000).

"Pravda Releases More Info on Sensational Energy Source Discovery" [on–line], Jul. 12, 2001 [retrieved on Aug. 8, 2001]. Retrieved from the Internet http;//www.100megsfree4.com/farshores/nrussen.htm (No Author Cited).

* cited by examiner

XRF ANALYSIS 321.54

321.62

321.66

COMPOSITION OF MATTER TAILORING: SYSTEM 1

SUMMARY OF THE INVENTION

All matter has structure. The structure of known matter emanates from the structure of the elements of the periodic table. It is the underlying structure of the elements and the new structures that arise as a consequence of their combination that define the electronic state and character of matter, mass, and energy. It is this state or structure—which can occur, at many levels—that creates the properties identified and associated with known elements and the matter that results from their combination and arrangement (e.g., the known elements, molecules, and matter).

This invention describes a new composition of matter: one created by changing the underlying electronic structure of any mass or matter containing a 'p', 'd', and/or 'f' atomic orbital (AO). The change (or changes) in electronic structure that creates the new composition of matter may occur anywhere within the defining matter. Changes that induce the formation of a new composition of matter are accompanied by change(s) in energy or mass or both, in any form or in any character. These changes can be controlled to be transient, fixed, or permanently adjustable; they may propagate into the subatomic core and then out to the bulk, or propagate directly from any stable moiety, particle, or energy level comprising the bulk (e.g., a subatomic particle or energy form, molecular force or molecular energy form) out to the bulk.

The function/variable that links all energy forms along all dimensions of energy is defined as a "zurn". A change or shift in the electronic state characterizing known matter is referred to, and defined, as an "isozurn" of that matter. The isozurn's variable value reflects the character and manner in which energy forms are linked (along all dimensions of energy). For example, a shift/change in the electronic state of an element is referred to as an isozurn of that element ($^{isozurn}$Element). Similarly, since the configuration of matter can mix energy forms, a new electronic state of matter is referred to as an isozurn of the specified matter configuration ($^{isozurn}$Matter). Note that the definition (and hence its application) of an isozurn is recursive reflecting the recursive construction of matter (e.g., $^{isozurn-10}$matter-10 is built from $^{isozurn-9}$matter-9 which is built from $^{isozurn-8}$matter-8 . . . which is built from $^{isozurn-9}$matter-1).

The present invention has many advantages. Modification of a species zurn function creates new compositions of matter. Proper and correct modification of a species zurn function induces controlled physical property change (e.g., conductivity, density, modulus, corrosion resistance, elasticity, etc.) in the new composition of matter. Examples of composition of matter tailoring for physical property enhancement include, but are not limited to, (1) mechanical property modification (e.g., density, toughness, hardness, modulus) for enhanced metal and/or material performance, (2) chemical property modification (e.g., catalytic performance, corrosion resistance) for enhanced chemical activity and/or resistance, (3) electronic property modification (e.g., conductance, inductance, phase angle) such as resistivity modification for enhanced conductance. A species zurn function exists along a continuum enabling physical properties associated with the new composition of matter to be adjustable along a continuum.

The affect of the zurn is adjustable and tailorable along the time dimension. Consequently, property change can be tailored/controlled to be permanent (i.e., unalterable and invariant); adjustable (i.e., alterable and invariant at the rest value), or; (3) transient (i.e., alterable and variant)—note a transient change to property-1 (or property set-1) can induce a permanent, adjustable, or transient change in property-2 (or property set-2).

Figure 1A:
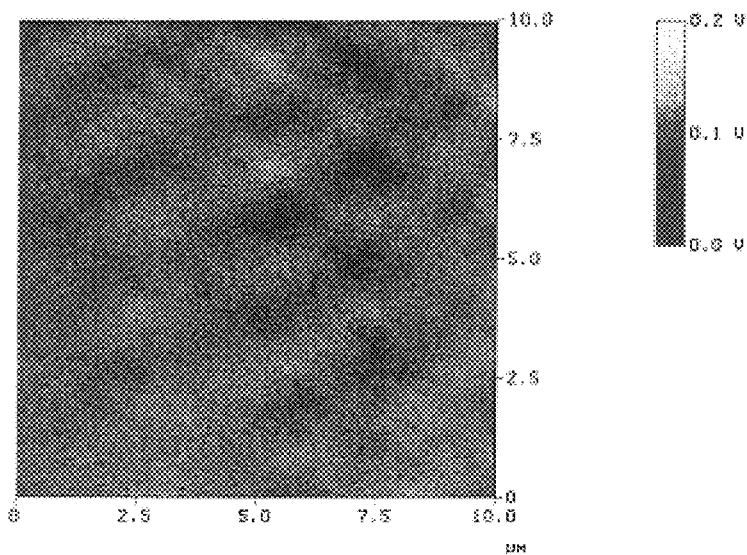
FIGS. 1A and 1B show magnetic force microscopy images of natural copper and tailored copper, respectively.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

Definitions of Acronyms AO—Atomic Orbital
SEM—Scanning electron microscopy
TEM—Tunneling Electron Microscopy
STM—Scanning Tunneling Microscopy
AFM—Atomic Force Microscopy
LFM—Lateral Force Microscopy
MFM—Magnetic Force Microscopy
XES—X-ray Emission Spectrometry
XRF—X-ray Fluorescence Spectrometry

DETAILED DESCRIPTION OF THE INVENTION

This invention identifies a new composition of matter for mass and/or matter comprised of 'p', 'd', and/or 'f' atomic orbitals. This change in electronic structure comprises or manifests itself in a change in energy, mass, electronic properties, physical properties, and the like. The electronic change can be controlled to be transient, fixed, or adjustable (temporarily permanent) and typically manifests itself in a change in properties (e.g., mechanical, electrical, chemical, thermal, engineering, physical) and/or structural character (e.g., alignment, orientation, order, anisotropy, and the like). Changes in electronic structure can be direct or indirect.

Electromagnetic chemistry is the science that affects the transfer and circulation of energy in many forms when induced by changes in electromagnetic energy. The theory of Electrodynamics of Moving Bodies (Einstein, 1905), mandates that when the electrodynamic components of the material are manipulated, changes in the energy levels within the atomic orbitals must be induced. These changes in the atomic orbitals are the vehicles by which changes in the (material) properties, both the magnitude and/or the orientation, can occur. Alignment of the electrodynamic component induces affects that may result in significant changes in the underlying material species: (1) alignment of atoms with the resulting directionality of physical properties; (2) alignment of energy levels and the capability to produce harmonics, may establish physical properties conducive for energy transfer, (3) alignment of the electrodynamic component include the opening of pathways for free electron flow, and; (4) alignment of electrodynamic field phase orientation.

The conservation of energy requires that all mass—independent of magnitude and/or configuration—has an isozurn value, as must any energy form of different character and/or dimension. Adjustment/manipulation of the zurn invoking a change in the isozurn value different than its naturally occurring value, accounting for the contribution of its rest state value, modifies the electronic structure that defines the natural state. A change in the isozurn value to a value different than that which specifies the natural state denotes a change in the underlying electronic state of the specified species.

A new composition of matter, created by altering and/or changing the zurn's natural function, can manifest itself as a transient, adjustable, or permanent change in energy, mass, and/or associated properties broadly defined. Property change can be exhibited as or comprise a change in: (1) structural atomic character (e.g., XES/XRF peak creation, peak fluidity, peak intensity, peak centroid, peak profile as a function of material/sample orientation, atomic energy level (s), and TEM, STM, MFM scans); (2) electronic character (e.g., electron electromagnetic interactions, electromagnetic field position/orientation, energy gradients, Hall effect, voltage, capacitance, voltage decay rate, voltage gradient, voltage signature including slope of decay and/or change of slope decay, voltage magnitude, voltage orientation); (3) structural molecular/atomic character (e.g, SEM, TEM, STM, AFM, LFM, and MFM scans, optical microscopy images, and structural orientation, ordering, long range alignment/ordering, anisotropy); (4) physical constants (e.g., color, crystalline form, specific rotation, emissivity, melting point, boiling point, density, refractive index, solubility, hardness, surface tension, dielectric, magnetic susceptibility, coefficient of friction, x-ray wavelengths); (5) physical properties (e.g., mechanical, chemical, electrical, thermal, engineering, and the like); and, (6) any change that differentiates naturally occurring materials from tailored materials created by inducing a change in matter (i.e., a new composition of matter). A change in property value, that departs from the property value specifying its naturally occurring state, denotes a change in the isozurn value of that state.

A change in the isozurn value is typically first noted at the subatomic, atomic, or molecular level. The complexity of energy interactions however often impedes single variable isolation. In these cases, a change in the electronic state of the specified species typically manifests itself as a change in a property value(s) from the naturally occurring state (e.g., the unaltered entropic driven ground state).

Typical changes denoting a change in property value, that departs from the property value specifying its naturally occurring state, dictating a change in the isozurn value of that state are exhibited and described below. Changes are classified according to: (1) structural atomic character; (2) electronic character; (3) structural molecular/atomic character; (4) physical constants; (5) physical properties; and, (6) any change that differentiates naturally occurring materials from tailored materials created by inducing a change in matter (i.e., a new composition of matter) are described individually below.

1. Structural Atomic Character

Figure 1B:
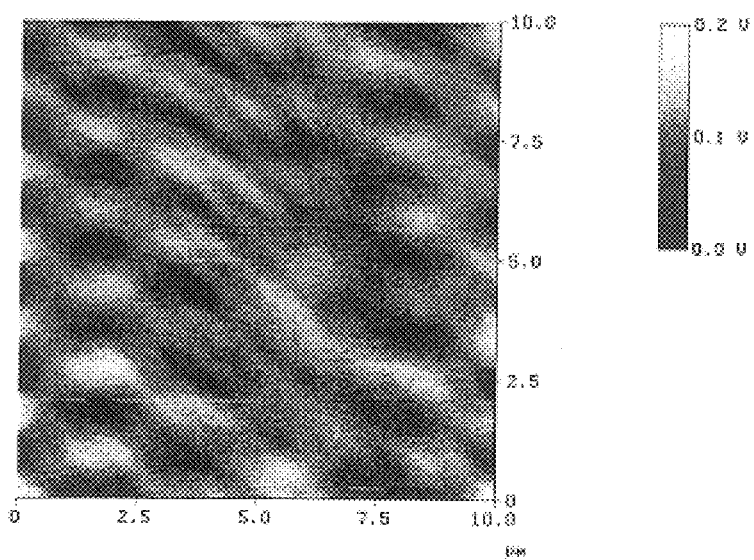
Figure 2A:
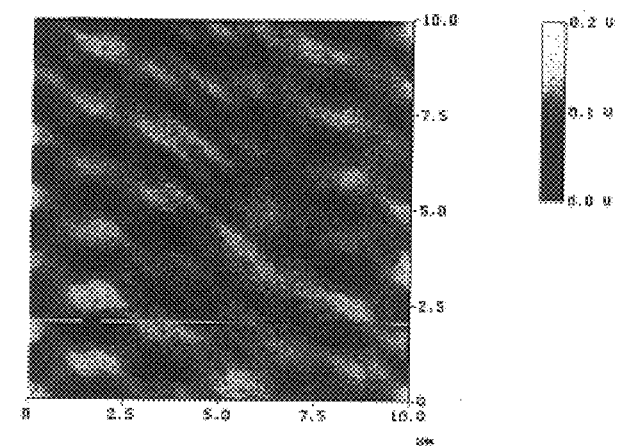
FIGS. 2A and 2B show magnetic force microscopy and scanning tunneling microscopy images of tailored copper, respectively.
Figure 2B:
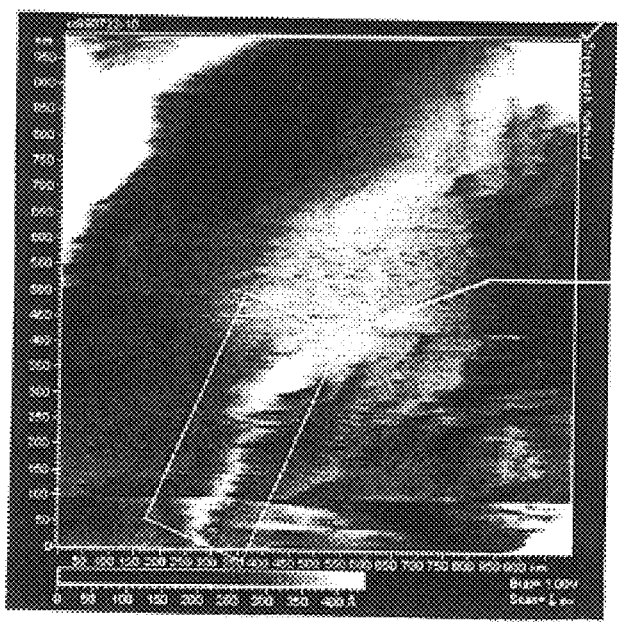
Figure 3A:
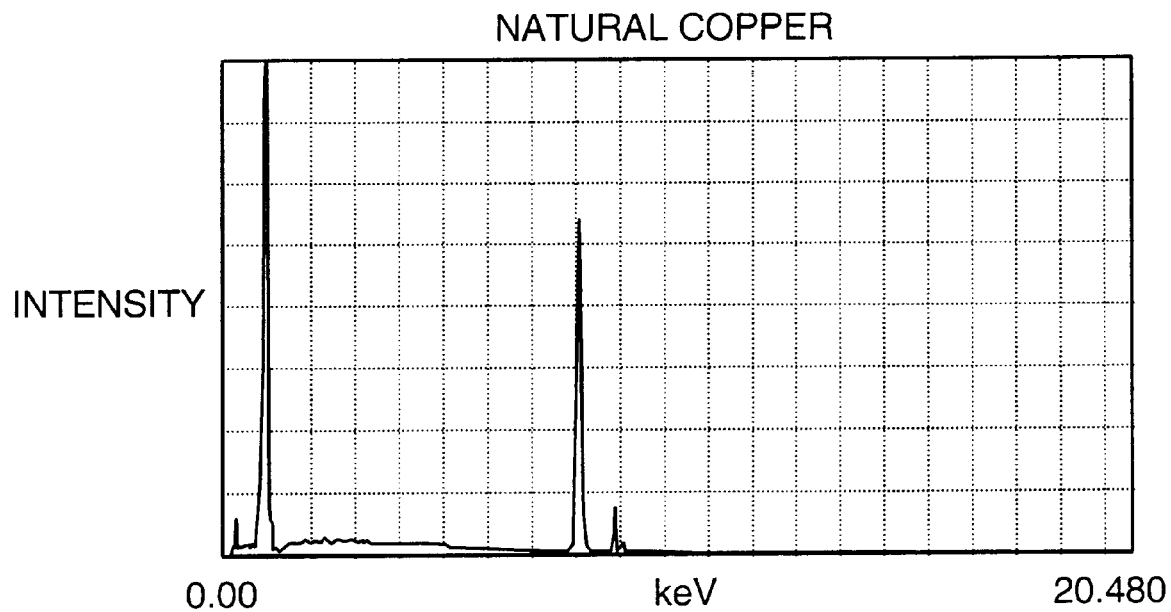
FIGS. 3A, 3B, and 4A and 4B show X-ray emission spectrometry images of natural copper and tailored copper.
Figure 3B:
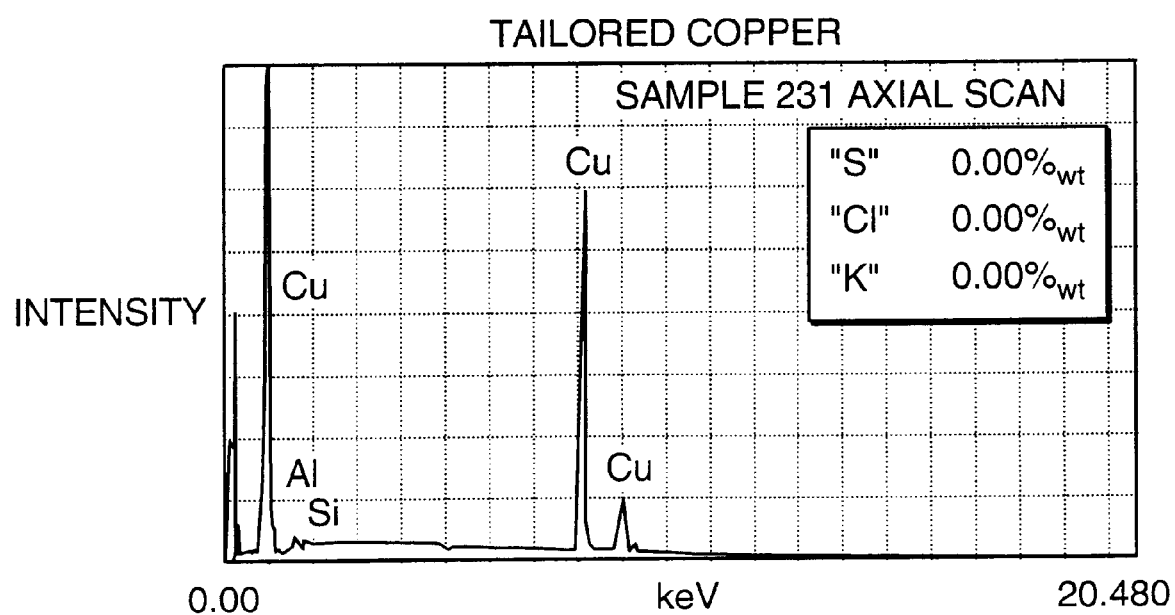
Figure 4A:
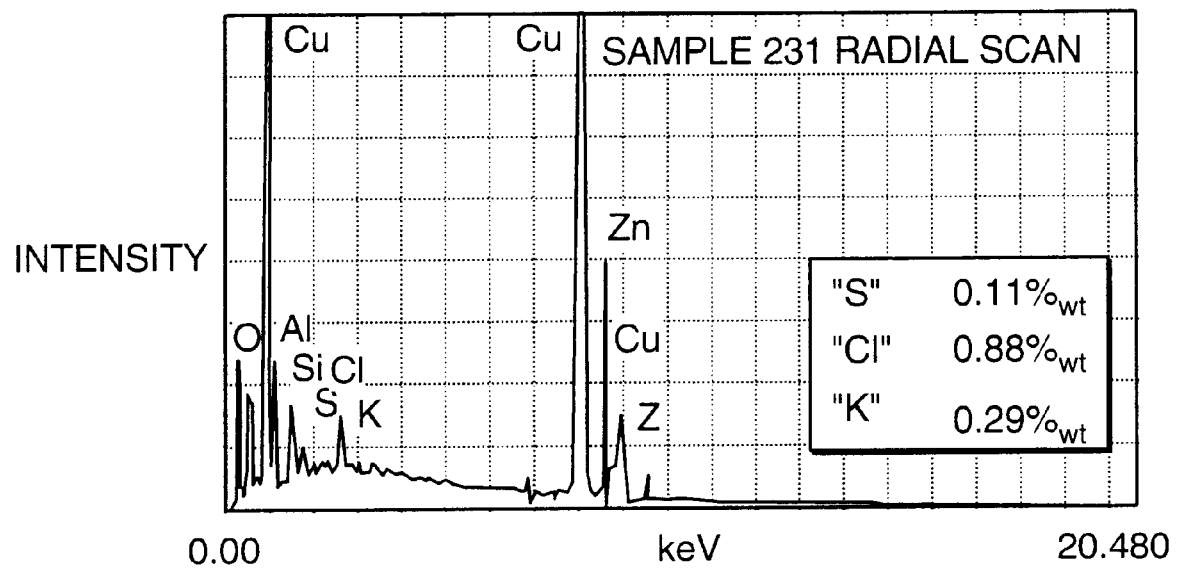
Figure 4B:
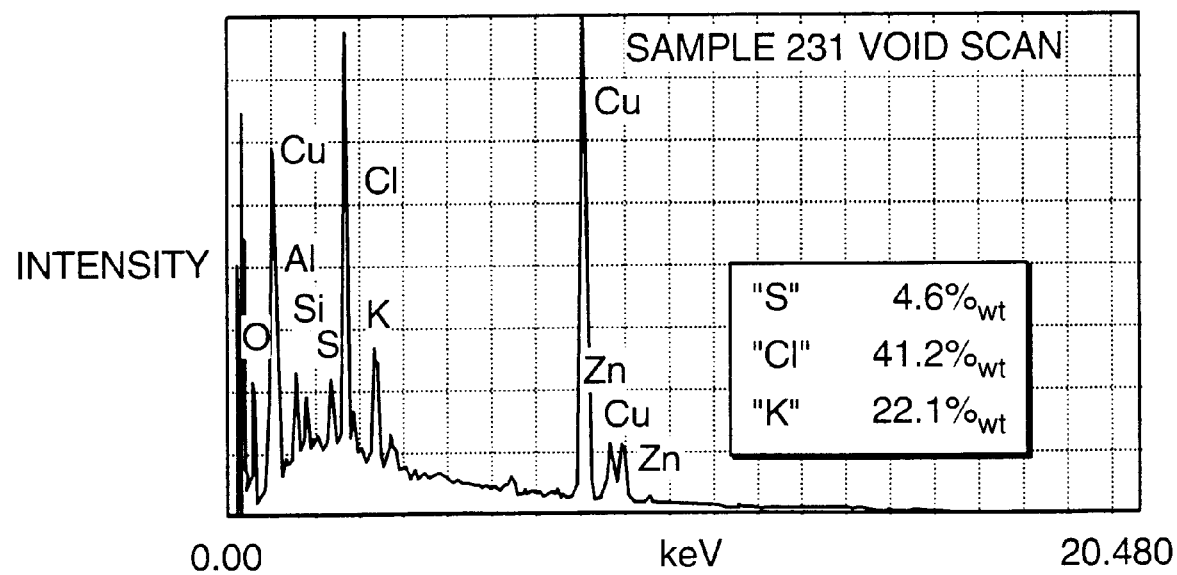

FIG. 1A shows non-contact, magnetic force microscopy image of natural copper—the control standard—and FIG. 1B shows a new composition of matter: tailored copper; as is evidenced in the altered and aligned electromagnetic network. FIG. 2A shows non-contact, magnetic force microscopy (MFM) and FIG. 2B shows scanning tunneling microscopy (STM) scans. Individually—and from differing vantage points—these scans show with clarity the outline of the changed electromagnetic energy network. The MFM scan shows the radial trace while the STM scan shows the axial trace.

Figure 5A:
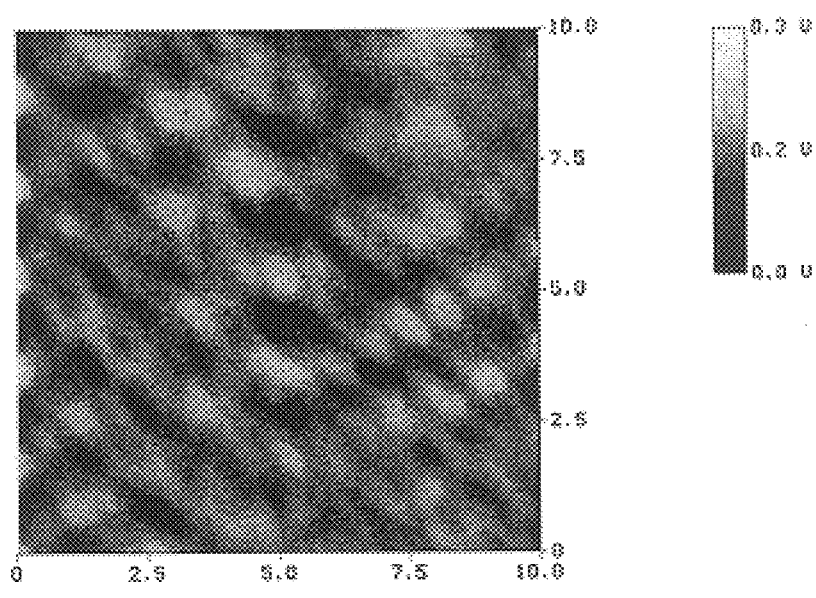
FIG. 5A shows a magnetic force microscopy image of tailored copper.

XES analysis of the control standard compared to the atomically altered (i.e., tailored) state are shown in FIGS. 3A, 3B and 4A and 4B. Tailored copper in the axial direction exhibits similar composition to natural copper (i.e., $\geq 99.995\%_{wt}$), but radial scans exhibit new peaks in the region close to naturally occurring S, Cl, and K. The absence of detectable levels of these constituents in the axial direction excludes natural contamination. The shifting centroid of the observed peaks from the natural species (i.e., S, Cl, K) confirm electronic change in the atomic state of the base element; as does the non-contact MFM void scan (FIG. 5A). Conventional chemical analysis performed using a LECO (IR) analyzer confirmed the absence of sulfur at XES lower detection limits. LECO analysis confirmed sulfur concentration at 7.8 ppm; collaborating this analysis was the manufacture's batch product analysis at 7.0 ppm S.

Figure 5B:
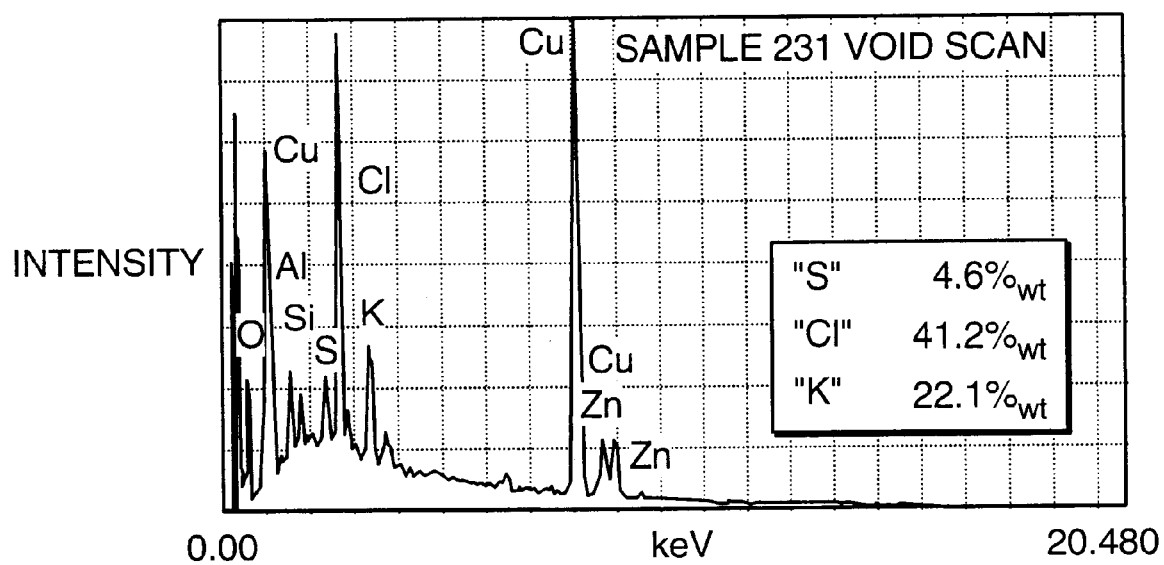
FIG. 5B shows a X-ray emission spectroscopy image of tailored copper.

FIG. 5B compares the XES radial scan of tailored copper to that of a void space within the same material. The dramatic change in signal count/intensity—a consequence of an underlying change in atomic character—is confirmed independently by non-contact MFM of the void space (FIG. 5A). MFM evidence highlights the structure and its changed orientation and alignment compared to the a control MFM (FIG. 1A).

Figure 6A:
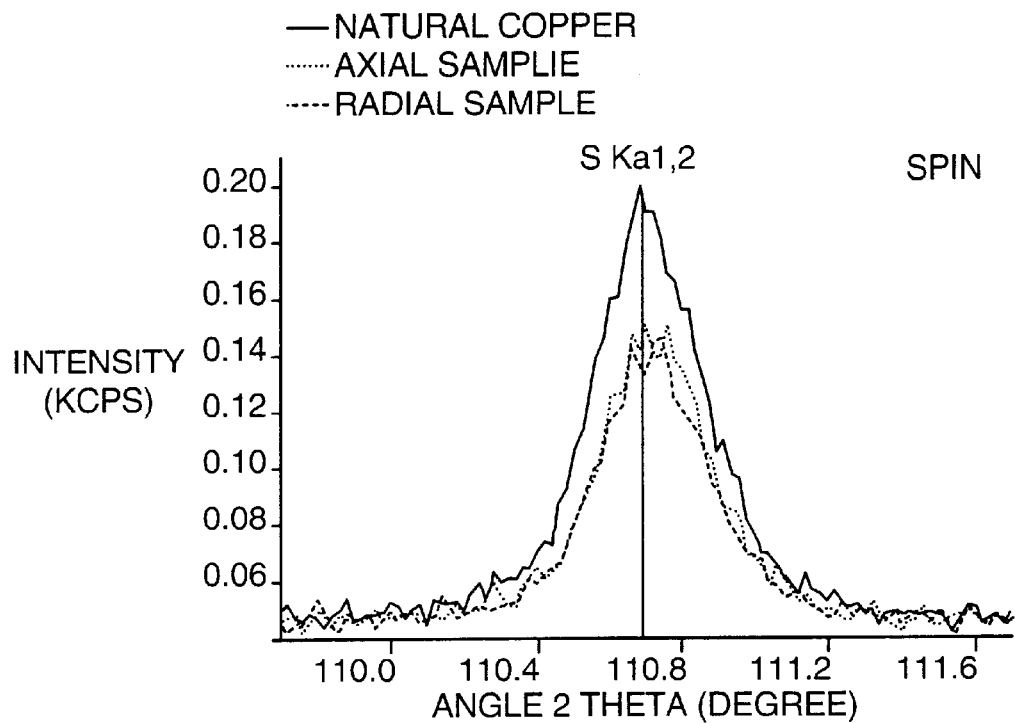
FIGS. 6A and 6B show a plot of an X-ray fluorescence spectrometry comparison of tailored copper and natural copper.
Figure 6B:
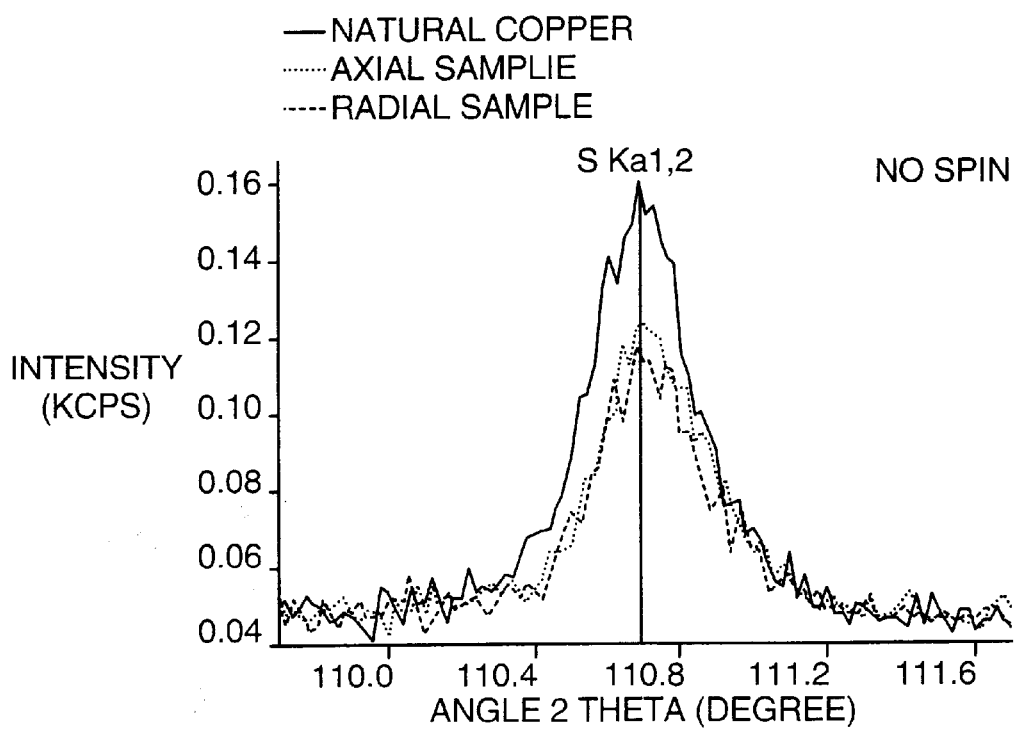
Figure 7:
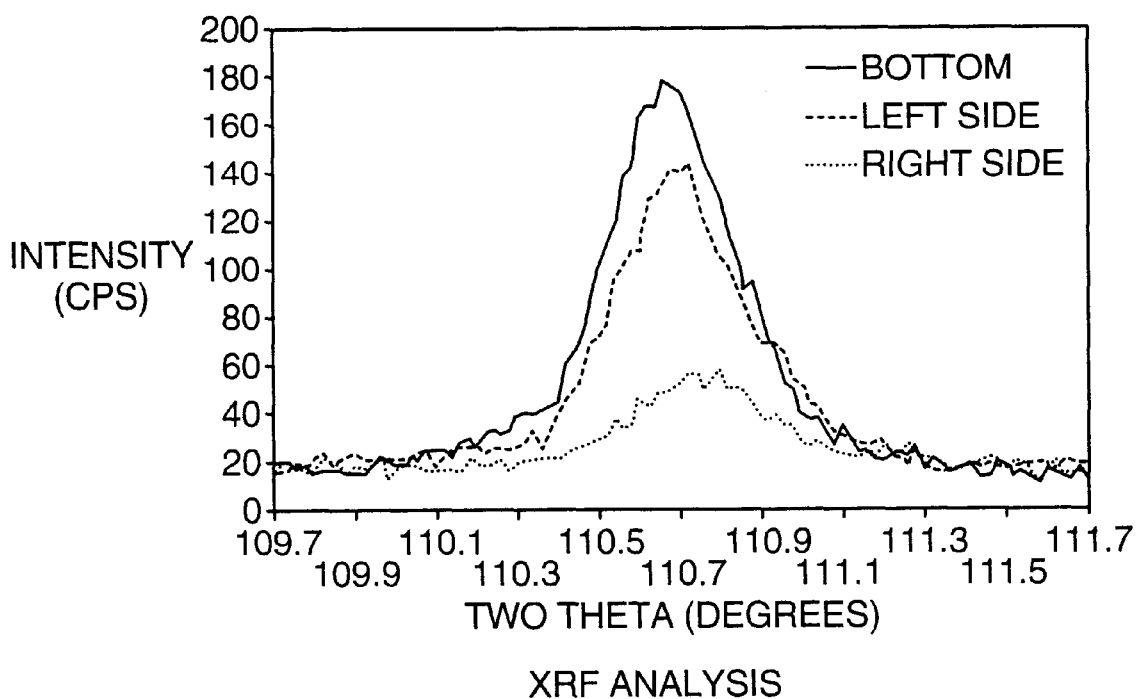
FIG. 7 shows a plot of an X-ray fluorescence spectrometry in relation to the direction of the scan.

High precision XRF imaging of the tailored copper's $K_\alpha$ line in the vicinity of natural sulfur's $K_\alpha$ line highlights that the electronic structure change has shifted the two theta degree position compared to natural copper (FIGS. 6A and 6B). FIG. 7 shows an increase in signal intensity dependent upon which side the scan was taken and a shifting $K_\alpha$ centroid. These data predict the anisotropicity latter identified in the tailored sample as does the MFM scans (FIGS. 1B and 5A).

2. Electronic Character

Figure 8:
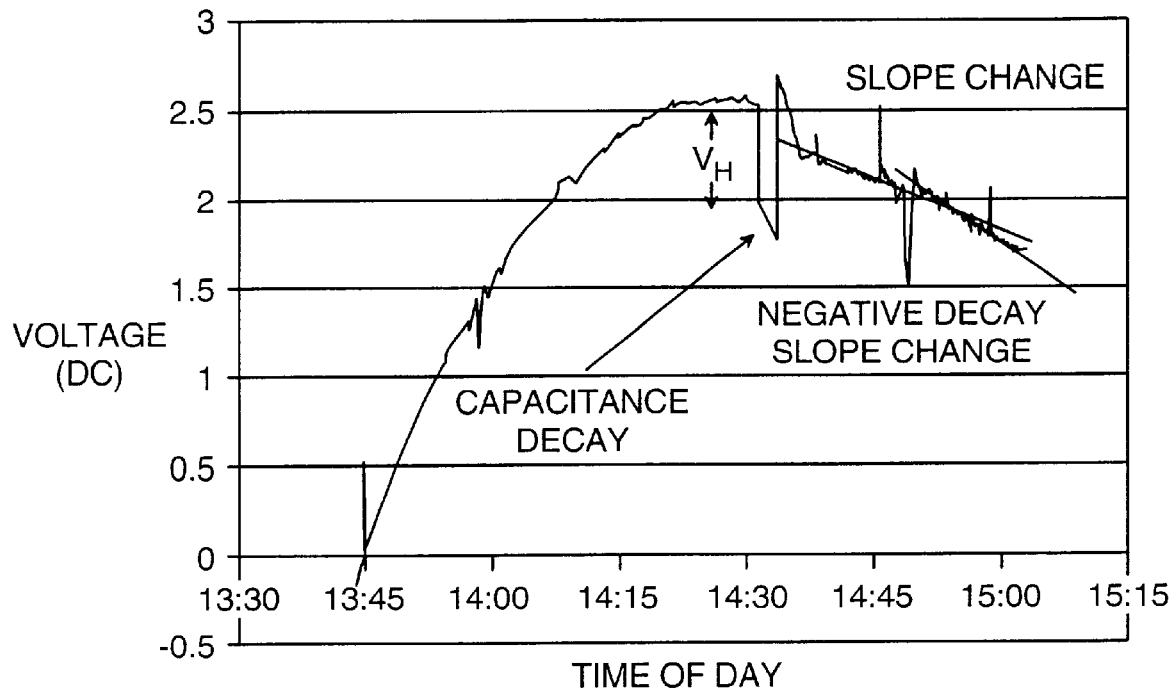
FIG. 8 shows a plot of a change in capacitance and voltage decay for a tailored element.
Figure 9:
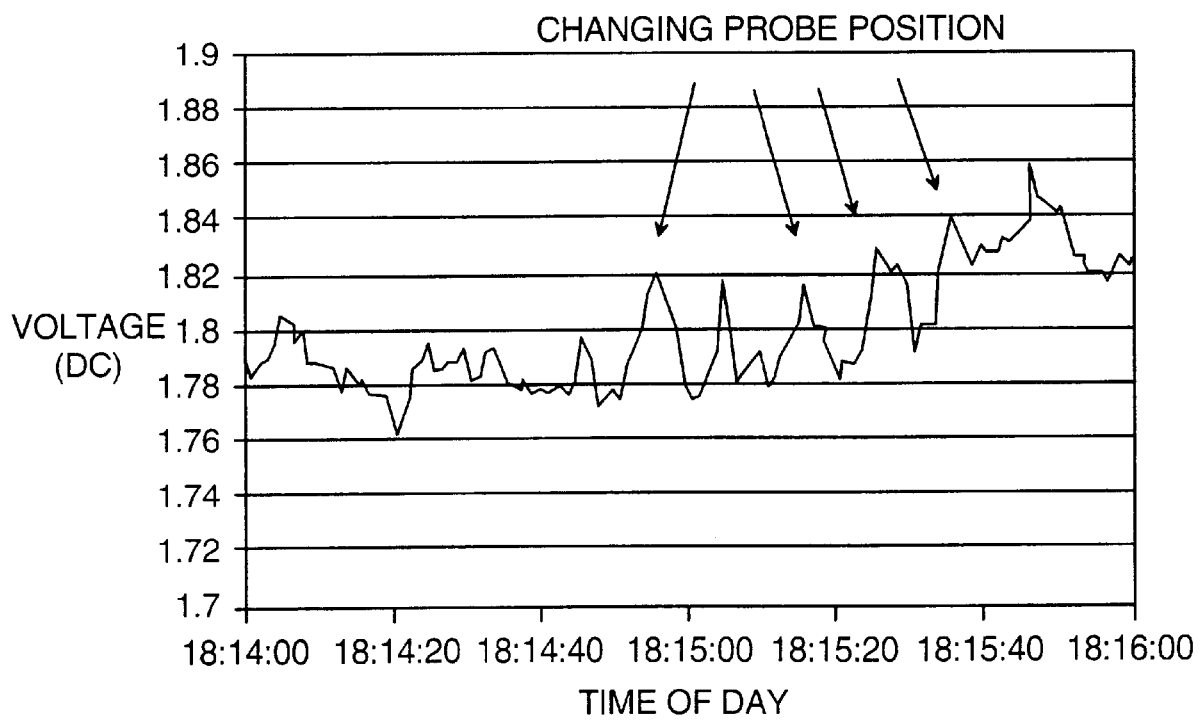
FIG. 9 shows a plot of a change in voltage gradients for a tailored element.

Manipulation of the electrodynamic components affecting the tailored orientation of a mass's electromagnetic field can enable the observance of a Hall voltage ($V_H$). Proper manipulation of the electrodynamic components enables intensification of electromagnetic field affording charge concentration on the surface of the atoms within the bulk as opposed to the bulk surface of the bath. Observations reflecting field repositioning may include changing capacitance and voltage decay rate (FIG. 8) or voltage gradients (FIG. 9) within a conducting bulk media.

Figure 10:
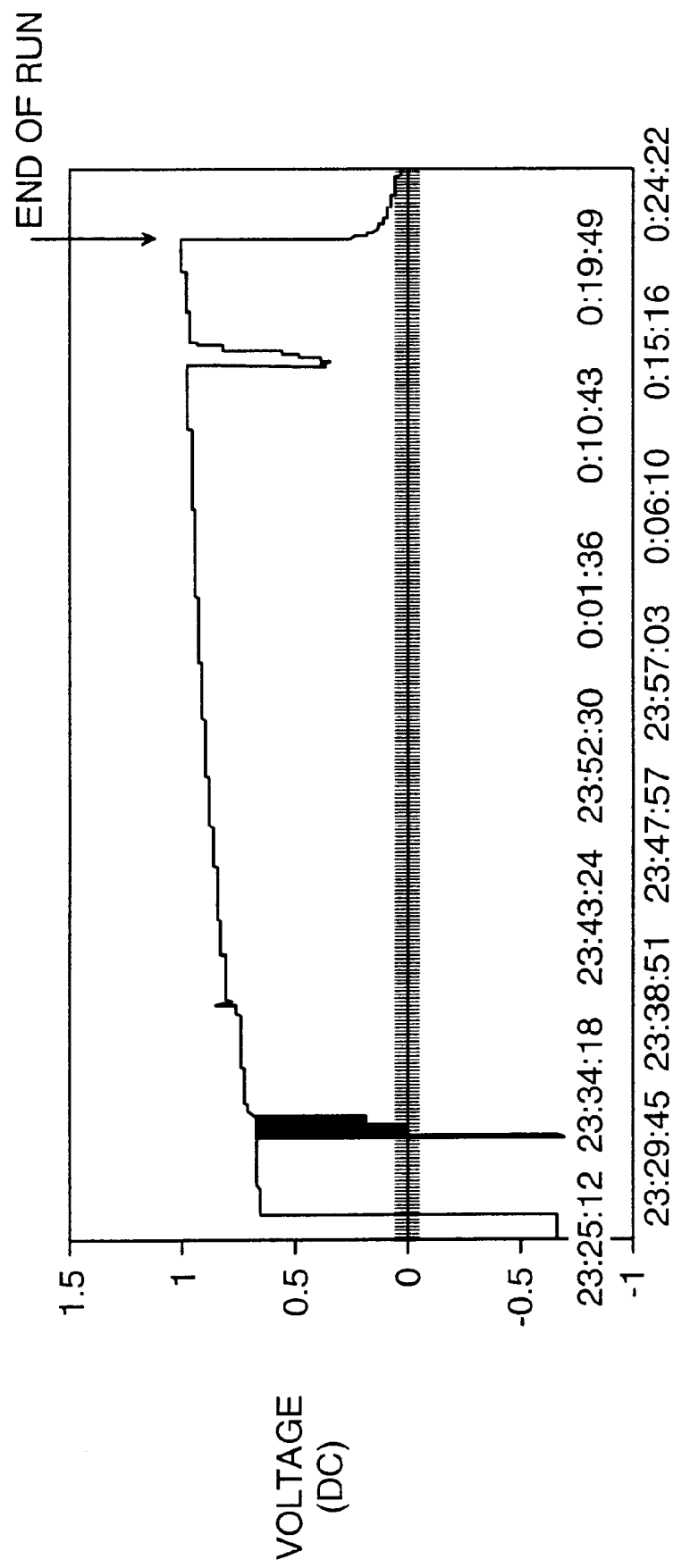
FIG. 10 shows a plot of voltage accumulation during an experiment.

Under different conditions, using a different metal system, a voltage of approximately 1 Vdc was accumulated over about one hour. FIG. 10 shows that voltage accumulation was continuously and steadily accumulated during the experiment, voltage accumulation correlated with chemical addition.

Figure 11:
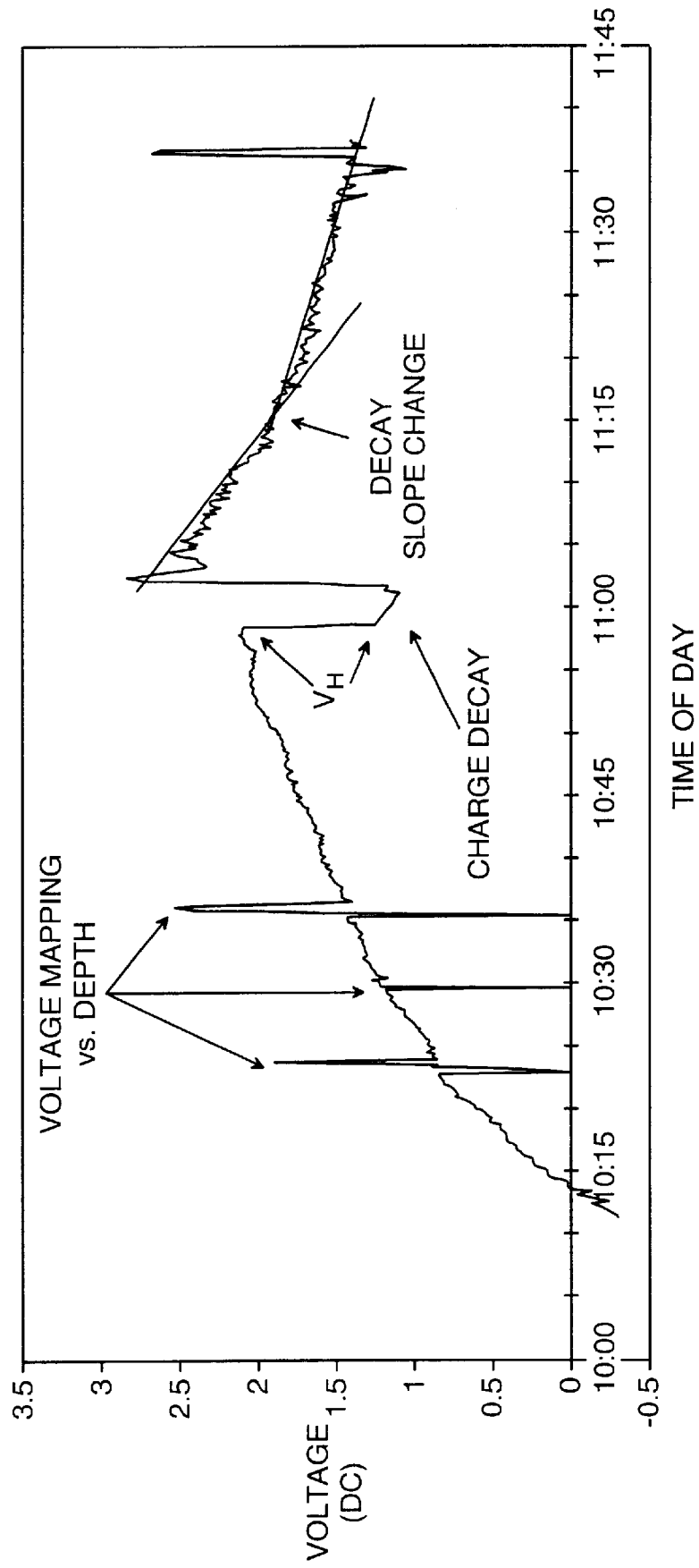
FIG. 11 shows a plot of the observed voltage of a tailored copper-nickel alloy.
Figure 12:
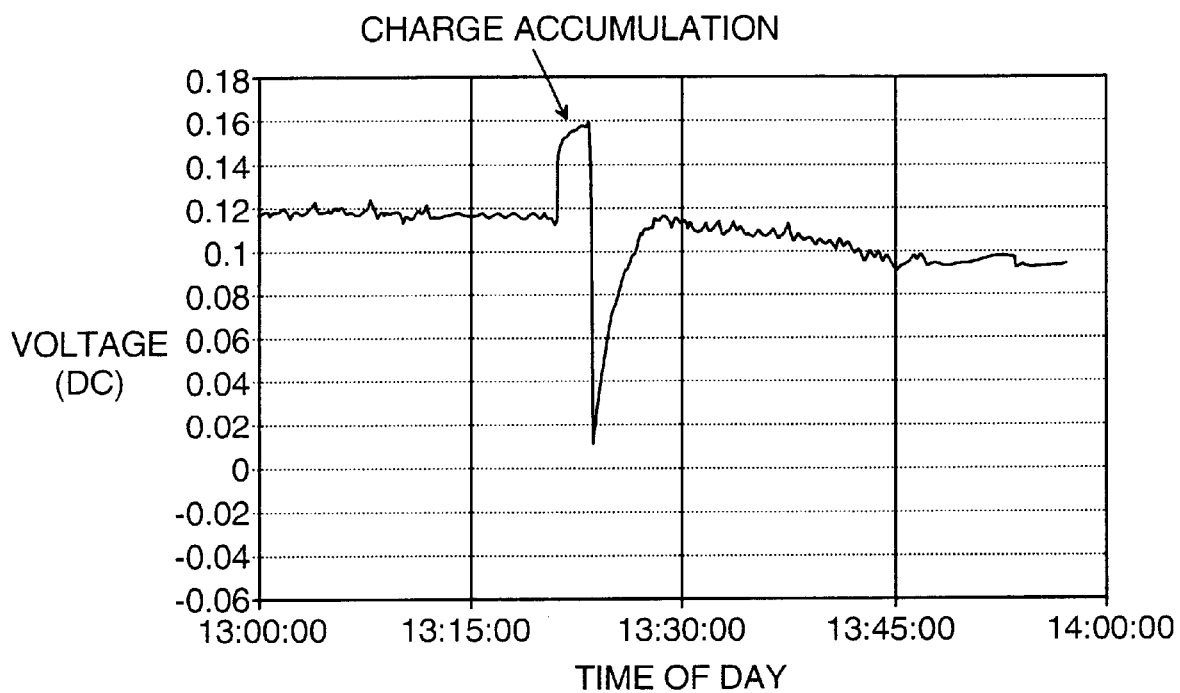
FIG. 12 shows a plot of the observed voltage of a tailored element.

FIG. 11 shows the $V_H$ observed in a copper-nickel alloy. Voltage decay exhibited two distinct decay rates, indicative of two controlling mechanisms. A positive voltage signature with a positive capacitance decay (i.e., capacitance accumulation) is shown in FIG. 12.

Figure 13:
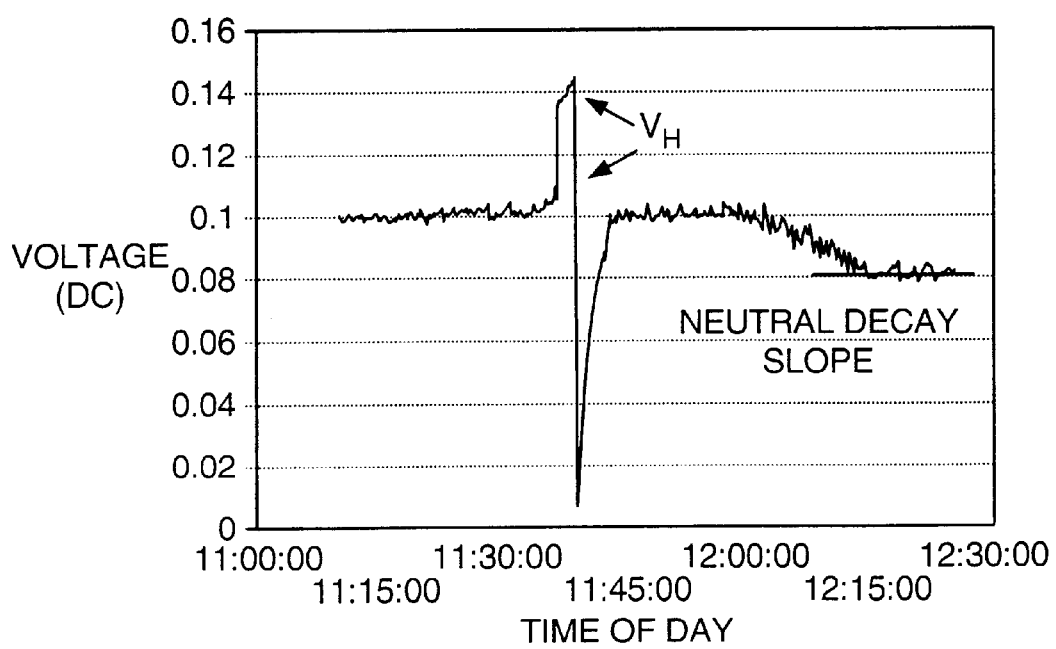
FIG. 13 shows a plot of a positive voltage signature and positive capacitance decay of a tailored element.
Figure 14:
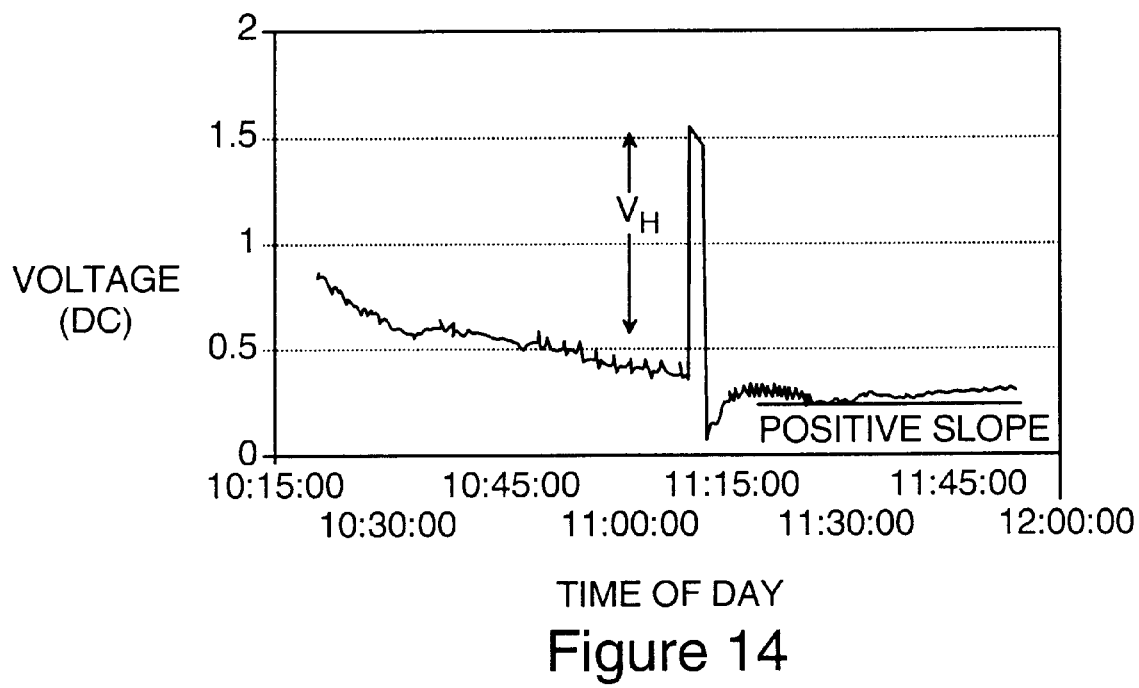
FIG. 14 shows a plot of a voltage decay profile of a tailored element.
Figure 15:
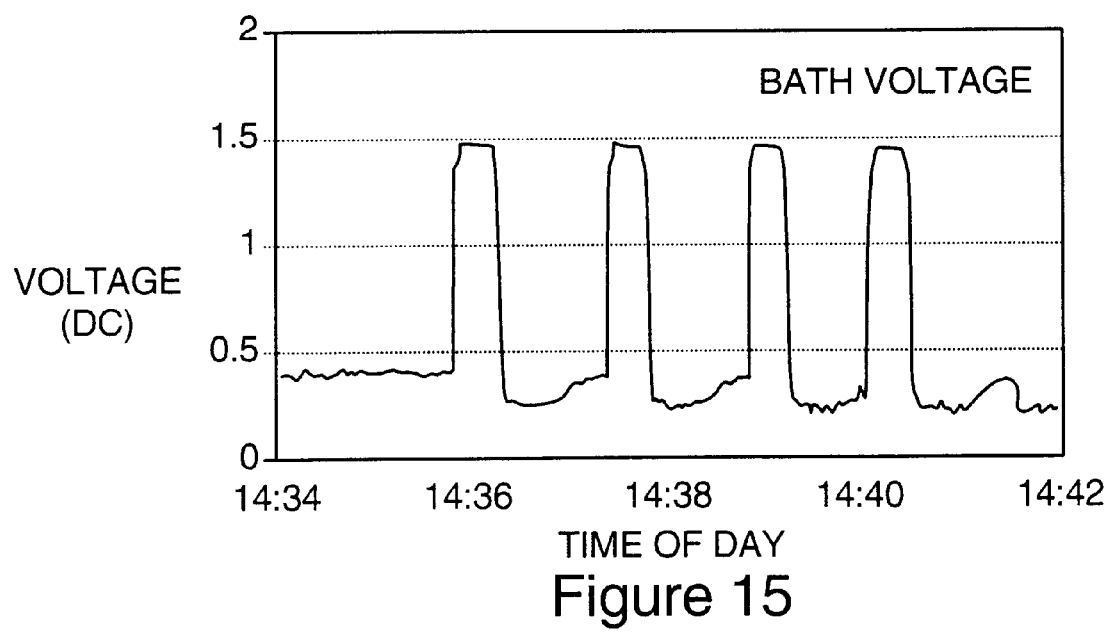
FIG. 15 shows a plot of a neutral decay in voltage and capacitance.
Figure 16:
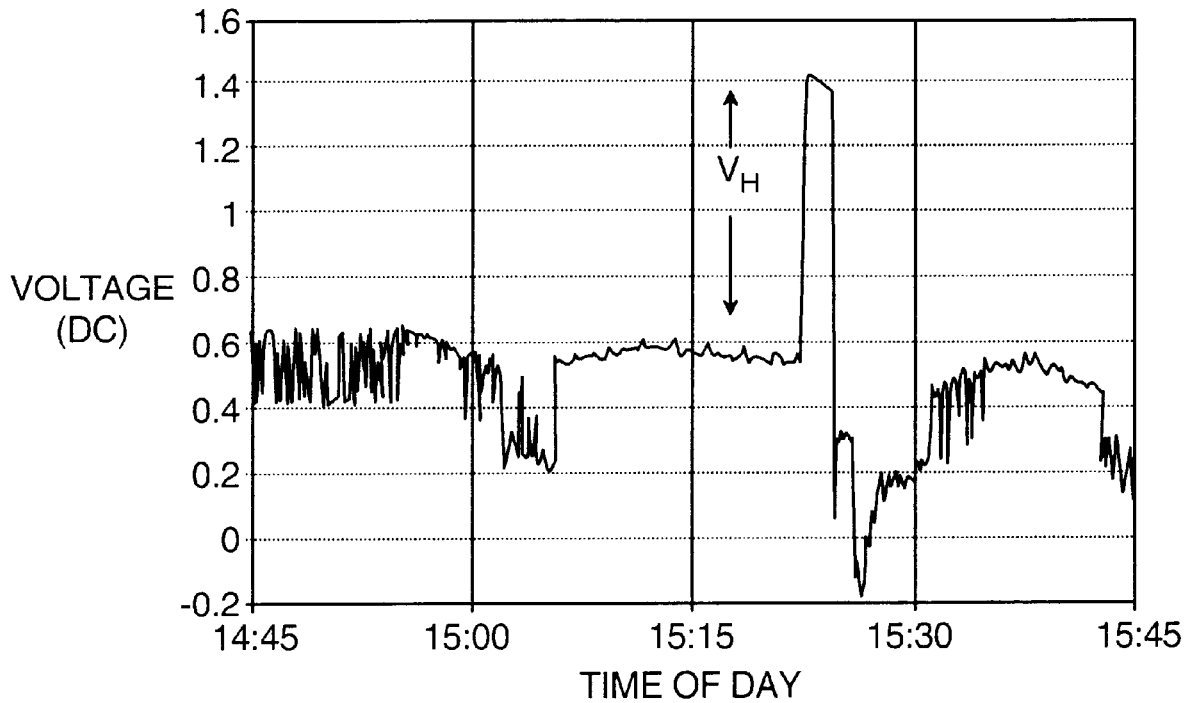
FIG. 16 is a plot of a voltage over time indicating that atomic orientation can be changed.
Figure 17:
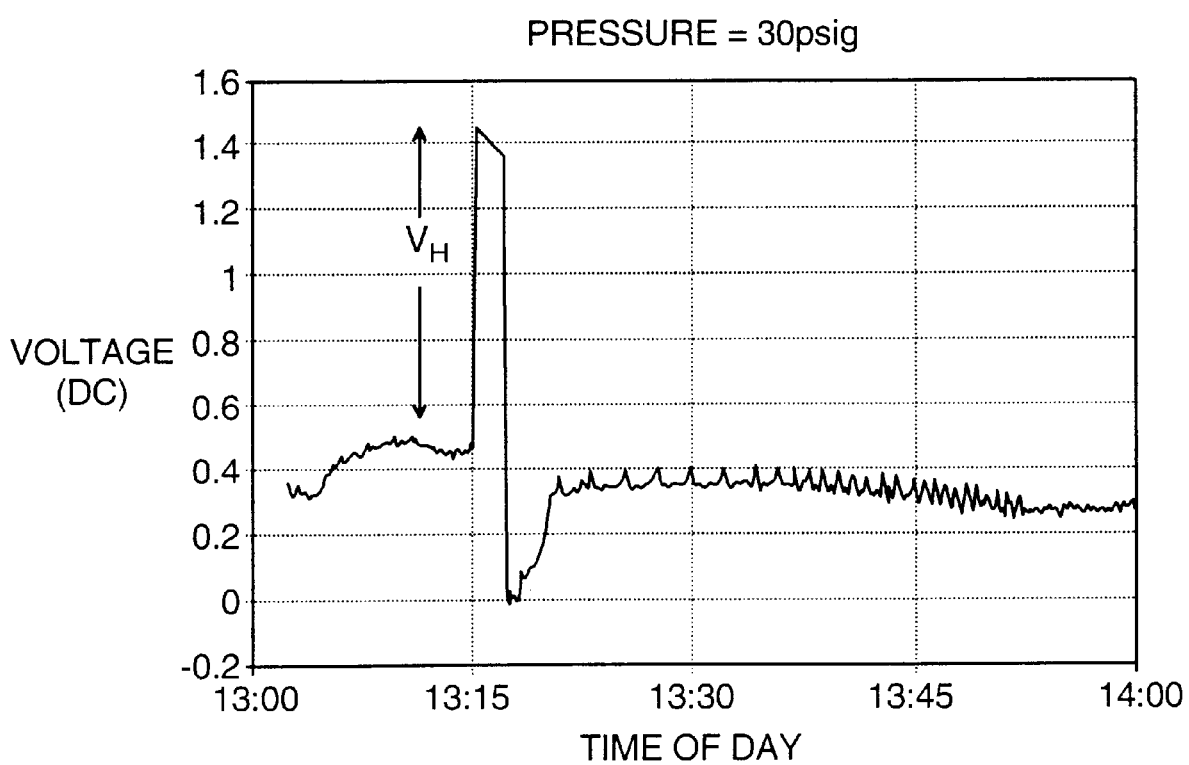
FIG. 17 is a plot of the voltage over time of a tailored element under pressure.
Figure 18A:
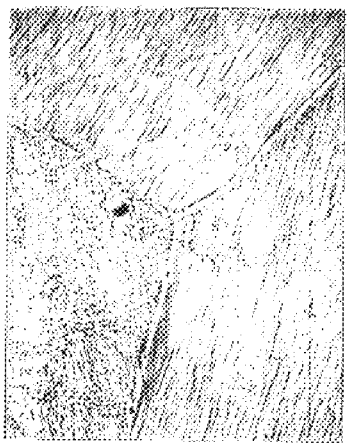
FIGS. 18A, 18B, 18C, 19A, 19B and 19C show scanning election electron microscopy images of tailored copper.
Figure 18B:
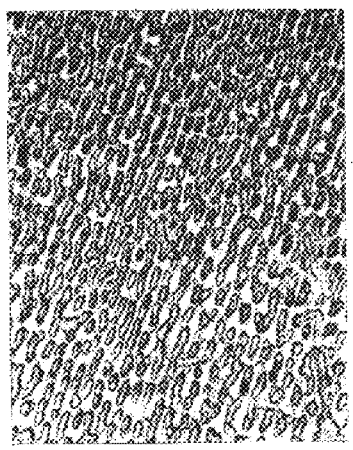
Figure 18C:
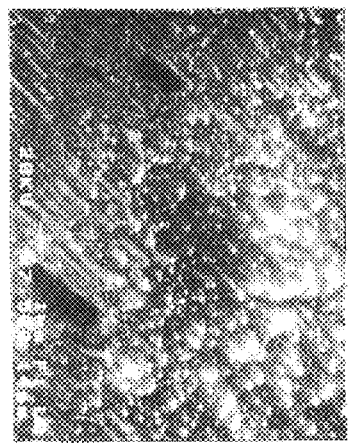
Figure 19A:
Figure 19B:
Figure 19C:
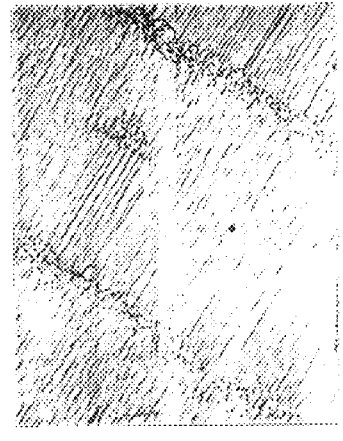
Figure 20A:
FIGS. 20A, 20B, 21A and 21B show scanning electron microscopy images of tailored nickel.
Figure 20B:
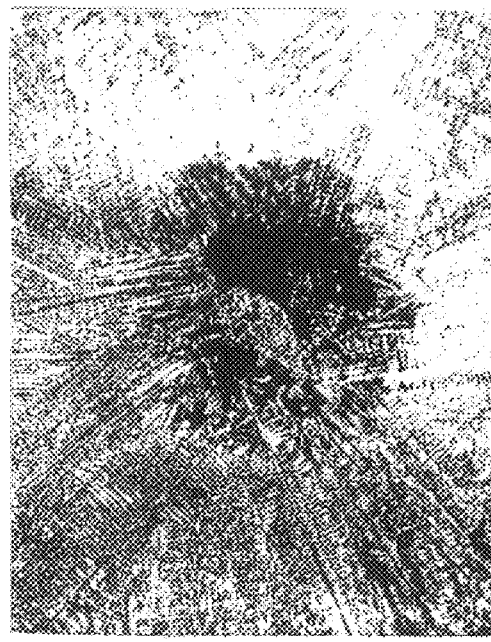
Figure 21A:
Figure 21B:
Figure 22A:
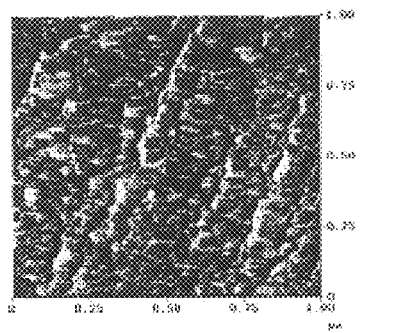
FIGS. 22A, 22B and 22C show images of atomic force microscopy and magnetic force microscopy of tailored copper from an axial analysis.
Figure 22B:
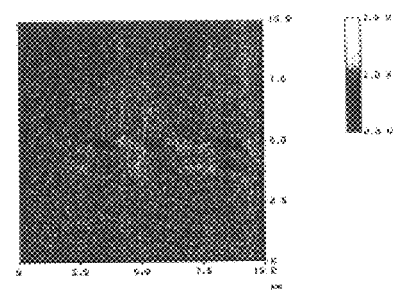
Figure 22C:
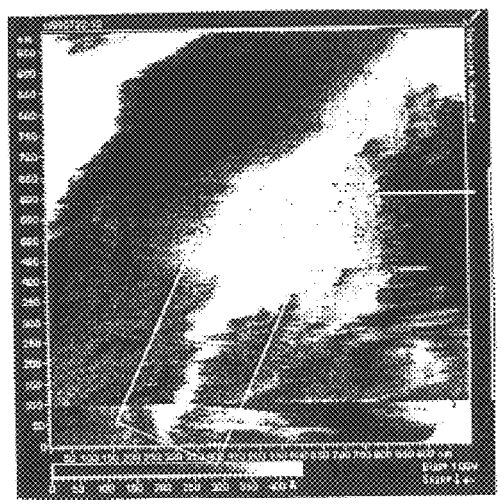
Figure 23A:
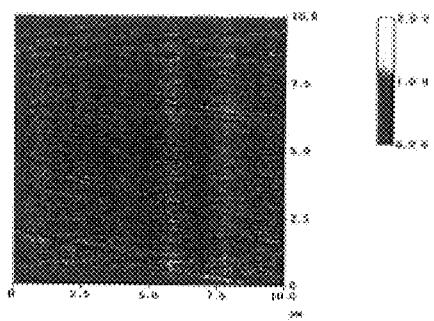
FIGS. 23A, 23B and 23C show images of atomic force microscopy and magnetic force microscopy of tailored copper from a radial analysis.
Figure 23B:
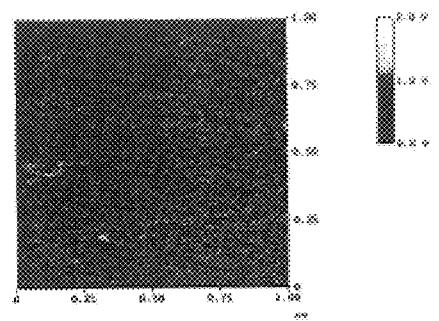
Figure 23C:
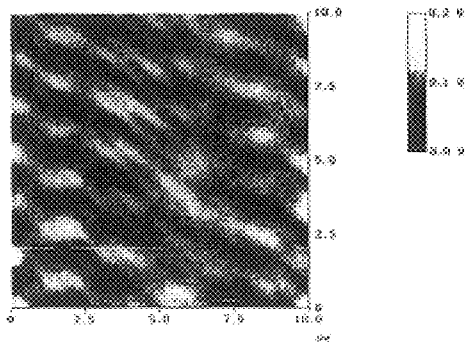

Control and manipulation of the charge signature (e.g., $V_H$ profile, capacitance slope, voltage slope) provides direct evidence of the alteration, manipulation, and tailoring of the underlying electronic state. FIG. 13 shows a positive voltage signature and a positive capacitance decay. Additionally, the voltage decay profile has changed: one profile has a negative slope while the other has a neutral slope. Further change in the electronic structure enables the slope of the second voltage decay profile to become positive (FIG. 14), note also the change in slope of capacitance decay. The metal system shown in FIG. 15 has an electronic structure change that enable a nearly neutral decay in voltage and capacitance. Measurements were repeated four times. FIG. 16 shows that the voltage can actually go negative, indicating that the orientation can also be manipulated. FIG. 17 shows the phenomena can be observed under pressure. Table 1 is an XRF Uniquant analysis that shows a multiplicity of energetically contiguous X-ray atomic energy levels. One energetically contiguous series is represented by Sm, Eu, Gd, Tb; the other is represented by P, S, So (i.e., sulfur as an oxide), Cl, and Ar. Table 2 is an XRF Uniquant analysis that shows an energetically contiguous series as Al, Si, P, S, So (i.e., sulfur as an oxide), Cl, Ar, K, and Ca.

3. Structural Molecular/Atomic Character

New compositions of matter can be electronically tailored to induce long range ordering/alignment. In one new composition of matter, long range ordering was induced in oxygen-free high conductivity (OFHC) copper. SEM imaging of the material verifies the degree and extent of long range ordering achieved (FIGS. 18A, 18B, 18C, 19A, 19B and 19C). Under similar electronic conditions, long range ordering was induced in high purity ($\geq 99.99\%_{wt}$)nickel. FIGS. 20A, 20B and 21A and 21B show the SEM imaging of the tailored nickel material. A comparison of the extent of alignment achieved between pre and post routine highlight an altered electronic state (reflecting a changed isozurn value) between $^{pre}$Ni and $^{post}$Ni.

Extensive atomic force microscopy and MFM imaging of electronically altered OFHC copper shows views of structural configurations from a different perspective (FIGS. 22A, 22B, 22C, 23A, 23B and 23C). MFM imaging shows clear pattern repetition and intensity of the tailored sample when compared to the natural copper (i.e., isozurn (natural) ≠isozurn (tailored)). The tailored copper: a new composition of matter derived from natural copper, exhibited anistropic behavior.

4. Physical Constants

In one sequence of new compositions of matter, color changes in OFHC copper were induced. The variation in color over four (4) new matter compositions ranged from black (two intensities) to copper (2 intensities) to gold (one intensity) to silver (one intensity). The alteration of copper's zurn function along the continuum enables the new composition of matter's color to be adjusted along the continuum.

In another sequence of new compositions of matter, hardness changes in OFHC copper were induced. The variation in diamond pyramid hardness between different tailored copper samples ranged from about 25 to 90 (or 3 to 9 times higher than natural copper). Hardness change was anisotropic.

Figure 24A:
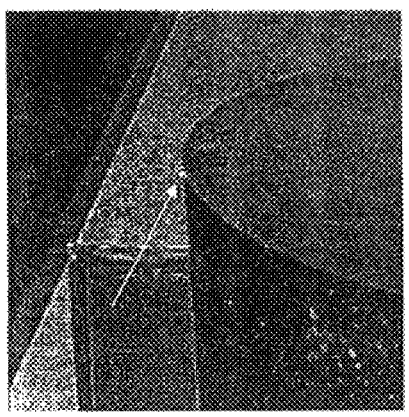
FIGS. 24A, 24B and 24C show images of induced magnetism of non-magnetic copper.
Figure 24B:
Figure 24C:

In another new composition of matter, magnetism was induced in a high purity, non-magnetic metal in its elemental form (FIGS. 24A, 24B and 24C).

5. Physical Properties

In one sequence of new compositions of matter, ductility changes were induced in a high purity, ductile metal in its elemental form. The variation in the engineering physical property of ductility ranged from brittle to semi-ductile to ductile to extremely ductile over four (4) new matter compositions.

Figure 25:
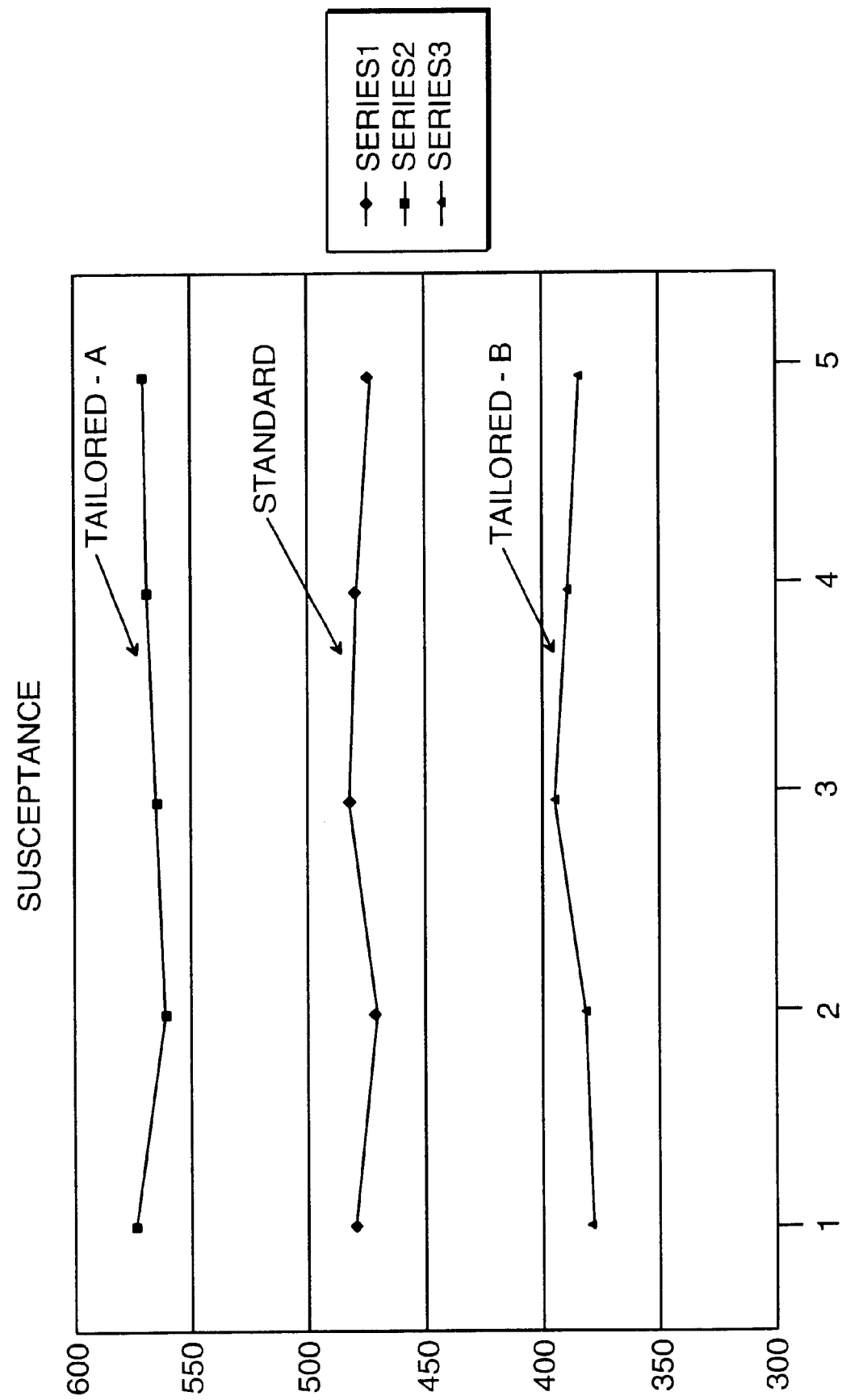
FIG. 25 shows a plot of electrical susceptance for tailored compositions in comparison to the compositions in its natural state.

In one new composition of matter, the electrical reactance was increased approximately 3% above that of natural copper over the frequency range of 0 Hz to 100 kHz. In another new composition of matter, electrical susceptance was increased approximately 20% above an alloy of the same chemical composition (i.e., the alloy in its natural state). In another new composition of matter, electrical susceptance was decreased approximately 25% below an alloy of the same chemical composition (i.e., the alloy in its natural state). Electrical susceptance for these new matter compositions compared to the control standard (the material in its natural state) is shown in FIG. 25.

6. Additional Differentiations

In one sequence of new compositions of matter—all which used the same raw materials, consumables, utilities, and materials of construction—the sum of all known (element) concentrations identified by XRF analysis varied considerably. Variations in XRF Uniquant closure over three (3) new matter compositions were $99.5\%_{wt}$ (Table 3), $96.0\%_{wt}$ (Table 2), and $90.6\%_{wt}$ (Table 1). The closure gap between the known elemental structures and the identified elemental structures differentiates naturally occurring materials from materials with tailored electronic structures (i.e., a new composition of matter).

These data are representative of the types of change new compositions of matter exhibit when the zurn function of a natural material or natural matter is altered. The data and characterization of potential change: (1) structural atomic character; (2) electronic character; (3) structural molecular/atomic character; (4) physical constants; (5) physical properties; and, (6) any differentiating change between natural moiety and tailored moiety (i.e., a new composition of matter); is not intended to be complete nor exhaustive. It is meant only to suggest the types of changes that can occur in new matter compositions created by altering the zurn function from its behavior that is associated with the naturally occurring state.

EXPERIMENTAL PROCEDURE

Definitions $^+n\%_{wt}$ represents the weight percent above the equilibrium saturation value of the material in its natural state. For example, $^+1\%_{wt}$ represents $1\%_{wt}$ above the saturation value as defined in its natural state.

$[n]_{eqsat}$ represents the equilibrium saturation of "n" in its natural state. For example, $[C]_{eqsat}$ represents the equilibrium saturation of carbon for the thermodynamic state specified (e.g., T, P, composition) when the composition is in its natural state.

Step 1:

Any element, material, or composition containing a 'p', 'd', and/or 'f' atomic orbital that is capable at least in part to dissolve, absorb, or react with a geometric form agent capable of altering the zurn's function.

Step 2:

1. Establish dissolved carbon level at 70% to 95% of $[C]_{eqsat}$.

2. Identify temperature set points for 80% and 95% $[C]_{eqsat}$.

3. Sweep the variant energy input between the predetermined set points

Sweep Conditions.
  7 minutes up.
  7 minutes down.
Sweep Count.
  15 complete cycles (no upper bound).

Step 3:

1. Establish flow of argon for dissolved carbon level at 70% to 95% of $[C]_{eqsat}$.

2. Identify temperature set points for dissolved carbon level at 70% to 95% of $[C]_{eqsat}$.

3. Sweep the variant energy input between the predetermined set points.

Temperature should be maintained above 70% $[C]_{eqsat}$ at all times.

Temperature should be maintained below 95% $[C]_{eqsat}$ at all times.

Sweep Conditions.
  7 minutes up.
  7 minutes down.
Sweep Count.
  5 complete cycles.

Step 4:

1. Raise carbon level to saturation (i.e., $[C]_{eqsat}$) with continued argon addition.

2. Hold for 60 minutes at saturation (i.e., $[C]_{eqsat}$) with continued argon addition.

3. Raise the carbon level to $^+1\%_{wt}$ of $[C]_{eqsat}$ with continued argon addition and hold for 5 minutes.

4. Sweep the variant energy input between $^+1\%_{wt}$ and $^+3\%_{wt}$ of $[C]_{eqsat}$.

Sweep Conditions.
  9 minutes up.
  9 minutes down.
Sweep Count.
  20 complete cycles (i.e., end at $^+1\%_{wt}$).

5. Cease argon addition.

6. Cool to $^+4\%_{wt}$.

7. Sweep the variant energy input between $^+4\%_{wt}$ and $^+7\%_{wt}$ of $[C]_{eqsat}$.

Sweep Conditions.
  3 minutes up.
  5 minutes down.
Sweep Count.
  4.5 complete cycles (i.e., end at $^+7\%_{wt}$).
Required Actions.
  Add argon on the up sweep.
  Add nitrogen on the down sweep.

8. Sweep the variant energy input between $^+8\%_{wt}$ and $^+18\%_{wt}$ of $[C]_{eqsat}$; cool to obtain $^+8\%_{wt}$ (with continued gas addition).

Sweep Conditions.
  15 minutes up.
  15 minutes down.
Sweep Count.
  15.5 complete cycles (i.e., end at $^+18\%_{wt}$).
Required Actions.
  Add argon on the up sweep.
  Add nitrogen on the down sweep.

9. Cease all gas addition.

Step 5:

1. Perform one complete sweep of the variant energy input between $^+14\%_{wt}$ to $^+18\%_{wt}$ of $[C]_{eqsat}$ (ending at $^+18\%_{wt}$) and then proceed immediately to a cool down that leads to solidification.

2. Cool down.

3. Solidify.

TABLE 1

ANALYSIS REPORT by Uniquant

Spectrometers configuration:   ARL 8410 Rh 60kV LiF220 LiF420 Gel11 T1AP
Sample ident =            Tailored - 3
Further info =
Kappa list =              15-Nov-94            Channel list = 23-Sep-99
Calculated as :           Elements             Spectral impurity data: CAL.209Teflon
X-ray path =              Vacuum               Film type = No supporting film
Case number =             0                    Known Area, % Rest, Diluent/Sample and Mass/Area
Eff. Diam. =              25.00 mm             Eff. Area = 490.6 mm2
KnownConc =               0%
Rest =                    0%
Dil/Sample =              0
Viewed Mass =             18000.00 mg
Sample Height =           5 mm
< means that the concentration is < 10 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| SumBe..F | 0 | 0.037 | 29 + Cu | 99.58 | 0.03 | 51 Sb | < | |
| 11 Na | < | | 30 + Zn | <2e | 0.006 | 52 Te | < | |
| 12 Mg | < | | 31 + Ga | 0.012 | 0.003 | 53 I | < | |
| 13 + Al | 0.027 | 0.012 | 32 Ge | <2e | 0.003 | 55 Cs | < | |
| 14 Si | < | | 33 As | < | | 56 Ba | < | |
| 15 + P | 0.003 | 0.001 | 34 Se | < | | SumLa..Lu | 0.15 | 0.07 |
| 16 + S | 0.038 | 0.003 | 35 Br | < | | 72 + Hf | <2e | 0.022 |
| 16 + So | 0.022 | 0.003 | 37 Rb | < | | 73 + Ta | <2e | 0.071 |
| 17 + Cl | 0.037 | 0.003 | 38 Sr | < | | 74 W | < | |
| 18 + Ar | 0.017 | 0.002 | 39 Y | < | | 75 Re | < | |
| 19 + K | <2e | 0.008 | 40 Zr | < | | 76 Os | < | |
| 20 + Ca | 0.0050 | 0.008 | 41 Nb | < | | 77 + Ir | 0.029 | 0.008 |
| 21 Sc | < | | 42 Mo | < | | 78 + Pt | 0.017 | 0.007 |
| 22 + Ti | 0.015 | 0.001 | 44 Ru | < | | 79 Au | <2e | 0.007 |
| 23 V | < | | 45 Rh | < | | 80 Hg | < | |
| 24 Cr | < | | 46 Pd | < | | 81 Tl | < | |
| 25 + Mn | 0.0069 | 0.0007 | 47 Ag | < | | 82 Pb | < | |
| 26 + Fe | 0.015 | 0.001 | 48 + Cd | 0.004 | 0.002 | 83 Bi | < | |
| 27 Co | < | | 49 In | < | | 90 Th | <2e | 0.003 |
| 28 Ni | < | | 50 Sn | < | | 92 U | < | |
| Light Elements | | | Noble Elements | | | Lanthanides | | |
| 4 Be | | | 44 Ru | < | | 57 + La | 0.073 | 0.006 |
| 5 B | | | 45 Rh | < | | 58 Ce | < | |
| 6 C | | | 46 Pd | < | | 59 Pr | < | |
| 7 N | | | 47 Ag | < | | 60 Nd | < | |
| 8 O | | | 75 Re | < | | 62 + Sm | 0.022 | 0.003 |
| 9 F | < | | 76 Os | < | | 63 + Eu | 0.015 | 0.002 |
| | | | 77 + Ir | 0.029 | 0.008 | 64 + Gd | 0.009 | 0.002 |
| | | | 78 + Pt | 0.017 | 0.007 | 65 + Tb | 0.015 | 0.002 |
| | | | 79 Au | <2e | 0.007 | 66 Dy | < | |
| | | | | | | 67 + Ho | <2e | 0.013 |
| | | | | | | 68 Er | <2e | 0.004 |
| | | | | | | 69 Tm | < | |
| | | | | | | 70 Yb | <2e | 0.005 |
| | | | | | | 71 + Lu | <2e | 0.013 |

KnownConc = 0
REST = 0
D/S = 0
Sum Conc's before normalisation to 100%: 90.6%

TABLE 2

ANALYSIS REPORT by Uniquant

Spectrometers configuration:   ARL 8410 Rh 60kV LiF220 LiF420 Gel11 T1AP
Sample ident =            Tailored - 2
Further info =
Kappa list =              15-Nov-94            Channel list = 23-Sep-99
Calculated as :           Elements             Spectral impurity data: CAL.209Teflon
X-ray path =              Vacuum               Film type = No supporting film
Case number =             0                    Known Area, % Rest, Diluent/Sample and Mass/Area
Eff. Diam. =              25.00 mm             Eff. Area = 490.6 mm2
KnownConc =               0%
Rest =                    0%
Dil/Sample =              0

TABLE 2-continued

ANALYSIS REPORT by Uniquant

Viewed Mass = 18000.00 mg
Sample Height = 5 mm
< means that the concentration is < 10 ppm
<2e means wt % < 2 StdErr. The + in Z + El means involved in Sum = 100%

| Z | wt % | StdErr | Z | wt % | StdErr | Z | wt % | StdErr |
|---|---|---|---|---|---|---|---|---|
| SumBe..F | 0 | 0.036 | 29 + Cu | 98.62 | 0.06 | 51 Sb | < | |
| 11 + Na | 0.11 | 0.02 | 30 + Zn | <2e | 0.006 | 52 Te | < | |
| 12 Mg | < | | 31 + Ga | 0.007 | 0.003 | 53 I | < | |
| 13 + Al | 0.44 | 0.03 | 32 Ge | <2e | 0.003 | 55 Cs | < | |
| 14 + Si | 0.107 | 0.008 | 33 As | < | | 56 Ba | < | |
| 15 + P | 0.004 | 0.001 | 34 Se | < | | SumLa..Lu | 0.087 | 0.072 |
| 16 + S | 0.019 | 0.01 | 35 Br | < | | 72 + Hf | < | |
| 16 + So | 0.12 | 0.01 | 37 Rb | < | | 73 + Ta | <2e | 0.071 |
| 17 + Cl | 0.17 | 0.01 | 38 Sr | < | | 74 W | < | |
| 18 + Ar | 0.027 | 0.002 | 39 Y | < | | 75 Re | < | |
| 19 + K | 0.0065 | 0.0010 | 40 Zr | < | | 76 Os | < | |
| 20 + Ca | 0.013 | 0.001 | 41 Nb | < | | 77 Ir | < | |
| 21 Sc | < | | 42 Mo | < | | 78 + Pt | 0.022 | 0.008 |
| 22 + Ti | 0.015 | 0.001 | 44 Ru | < | | 79 Au | <2e | 0.007 |
| 23 V | < | | 45 Rh | < | | 80 Hg | < | |
| 24 Cr | < | | 46 Pd | < | | 81 Tl | < | |
| 25 + Mn | <2e | 0.0006 | 47 Ag | < | | 82 Pb | < | |
| 26 + Fe | 0.044 | 0.004 | 48 Cd | <2e | 0.002 | 83 Bi | < | |
| 27 Co | < | | 49 In | < | | 90 Th | < | |
| 28 Ni | < | | 50 Sn | < | | 92 U | < | |
| Light Elements | | | Noble Elements | | | Lanthanides | | |
| 4 Be | | | 44 Ru | < | | 57 + La | 0.059 | 0.005 |
| 5 B | | | 45 Rh | < | | 58 Ce | <2e | 0.003 |
| 6 C | | | 46 Pd | < | | 59 Pr | <2e | 0.003 |
| 7 N | | | 47 Ag | < | | 60 Nd | <2e | 0.002 |
| 8 O | | | 75 Re | < | | 62 Sm | <2e | 0.003 |
| 9 F | < | | 76 Os | < | | 63 Eu | < | |
| | | | 77 Ir | < | | 64 Gd | < | |
| | | | 78 + Pt | 0.022 | 0.008 | 65 + Tb | 0.005 | 0.002 |
| | | | 79 Au | <2e | 0.007 | 66 Dy | <2e | 0.008 |
| | | | | | | 67 + Ho | <2e | 0.015 |
| | | | | | | 68 Er | <2e | 0.004 |
| | | | | | | 69 Tm | < | |
| | | | | | | 70 Yb | < | |
| | | | | | | 71 + Lu | < | |

KnownConc = 0
REST = 0
D/S = 0
Sum Conc's before normalisation to 100%: 96.0%

TABLE 3

ANALYSIS REPORT by Uniquant

Spectrometers configuration: ARL 8410 Rh 60kV LiF220 LiF420 Gel11 T1AP
Sample ident = Tailored - 1
Further info =
Kappa list = 15-Nov-94     Channel list = 20-Jul-94
Calculated as : Elements    Spectral impurity data: CAL.209Teflon
X-ray path = Vacuum     Film type = No supporting film
Case number = 0     Known Area, % Rest, Diluent/Sample and Mass/Area
Eff. Diam. = 25.00 mm     Eff. Area = 490.6 mm2
KnownConc = 0%
Rest = 0%
Dil/Sample = 0
Viewed Mass = 18000.00 mg
Sample Height = 5 mm
< means that the concentration is < 10 ppm
<2e means that Conc < 2 × StdErr

| Z | wt % | StdErr | Z | wt % | StdErr | Z | wt % | StdErr |
|---|---|---|---|---|---|---|---|---|
| SumBe..F | 0 | 0.036 | 29 Cu | 99.84 | 0.03 | 51 Sb | < | |
| 11 Na | < | | 30 Zn | < | | 52 Te | < | |
| 12 Mg | < | | 31 Ga | 0.007 | 0.003 | 53 I | < | |
| 13 Al | < | | 32 Ge | <2e | 0.002 | 55 Cs | < | |
| 14 Si | < | | 33 As | < | | 56 Ba | < | |

TABLE 3-continued

ANALYSIS REPORT by Uniquant

| | | | | | | | | |
|---|---|---|---|---|---|---|---|---|
| 15 P | < | | 34 Se | < | | SumLa..Lu | 0.053 | 0.071 |
| 16 S | 0.0089 | 0.0008 | 35 Br | < | | 72 Hf | <2e | 0.022 |
| 16 So | < | | 37 Rb | < | | 73 Ta | < | |
| 17 Cl | 0.017 | 0.001 | 38 Sr | < | | 74 W | < | |
| 18 Ar | < | | 39 Y | < | | 75 Re | < | |
| 19 K | <2e | 0.007 | 40 Zr | < | | 76 Os | < | |
| 20 Ca | 0.0024 | 0.0009 | 41 Nb | < | | 77 Ir | 0.040 | 0.008 |
| 21 Sc | <2e | 0.001 | 42 Mo | 0.005 | 0.002 | 78 Pt | < | |
| 22 Ti | 0.003 | 0.001 | 44 Ru | < | | 79 Au | <2e | 0.006 |
| 23 V | < | | 45 Rh | < | | 80 Hg | <2e | 0.006 |
| 24 Cr | < | | 46 Pd | < | | 81 Tl | < | |
| 25 Mn | < | | 47 Ag | < | | 82 Pb | < | |
| 26 Fe | < | | 48 Cd | < | | 83 Bi | < | |
| 27 Co | < | | 49 In | < | | 90 Th | 0.009 | 0.003 |
| 28 Ni | < | | 50 Sn | < | | 92 U | < | |
| Light Elements | | | Noble Elements | | | Lanthanides | | |
| 4 Be | | | 44 Ru | < | | 57 La | 0.030 | 0.006 |
| 5 B | | | 45 Rh | < | | 58 Ce | < | |
| 6 C | | | 46 Pd | < | | 59 Pr | < | |
| 7 N | | | 47 Ag | < | | 60 Nd | < | |
| 8 O | | | 75 Re | < | | 62 Sm | < | |
| 9 F | < | | 76 Os | < | | 63 Eu | <2e | 0.002 |
| | | | 77 Ir | 0.040 | 0.008 | 64 Gd | <2e | 0.002 |
| | | | 78 Pt | < | | 65 Tb | <2e | 0.002 |
| | | | 79 Au | <2e | 0.006 | 66 Dy | < | |
| | | | | | | 67 Ho | <2e | 0.015 |
| | | | | | | 68 Er | 0.014 | 0.004 |
| | | | | | | 69 Tm | <2e | 0.004 |
| | | | | | | 70 Yb | < | |
| | | | | | | 71 Lu | <2e | 0.014 |

KnownConc = 0
REST = 0
D/S = 0
Sum Conc's before normalisation to 100%: 99.5%

While this invention has been particularly shown and described with references to preferred embodiments thereof, it will be understood by those skilled in the art that various changes in form and details may be made therein without departing from the scope of the invention encompassed by the appended claims.

What is claimed is:

1. A manufactured copper characterized by the X-ray fluorescence spectrometry plot of FIG. 7.

2. A manufactured copper produced by the process comprising the steps of:

(1.) Melting metallic copper;

(2.) Adding a carbonaceous agent to the molten copper;

(3.) Varying the temperature of the molten copper between two temperatures over 15 cycles, wherein the molten copper remains at a temperature above the melting point during the entire step;

(4.) Establishing a flow of argon through the molten copper;

(5.) Varying the temperature of the molten copper between two temperatures over 5 cycles, wherein the molten copper remains at a temperature above the melting point during the entire step;

(6.) Saturating the molten copper with carbon;

(7.) Holding the carbon-saturated molten copper with argon addition;

(8.) Lowering the temperature of the molten copper, wherein the molten copper is supersaturated with carbon;

(9.) Varying the temperature of the copper between two temperatures over 20 cycles, wherein supersaturation with carbon is maintained and the molten copper remains at a temperature above the melting point during the entire step;

(10.) Ceasing argon addition;

(11.) Cooling the molten copper, such that the molten copper continues to be supersaturated with carbon and the molten copper remains at a temperature above the melting point;

(12.) Varying the temperature of the molten copper between two temperatures over 4.5 cycles, wherein supersaturation with carbon is maintained and the molten copper remains at a temperature above the melting point during the entire step, adding argon as the temperature is raised and adding nitrogen as the temperature is lowered;

(13.) Varying the temperature of the molten copper between two temperatures over 15.5 cycles, wherein supersaturation with carbon is maintained and the molten copper remains at a temperature above the melting point during the entire step, adding argon as the temperature is raised and adding nitrogen as the temperature is lowered;

(14.) Ceasing argon and nitrogen addition;

(15.) Varying the temperature of the molten copper between two temperatures over 1 cycle, wherein supersaturation with carbon is maintained and the molten copper remains at a temperature above the melting point during the entire step;

(16.) Cooling the molten copper to room temperature, thereby obtaining a solidified manufactured copper.

* * * * *

UNITED STATES PATENT AND TRADEMARK OFFICE
CERTIFICATE OF CORRECTION

PATENT NO. : 6,572,792 B1
DATED : June 3, 2003
INVENTOR(S) : Christopher J. Nagel It is certified that error appears in the above-identified patent and that said Letters Patent is hereby corrected as shown below:

Title page,
Item [73], Assignee, delete "Atomic Ordered Materials, L.L.C." and insert
-- Electromagnetics Corporation --.

Signed and Sealed this

Twenty-first Day of September, 2004

JON W. DUDAS
*Director of the United States Patent and Trademark Office*